United States Patent

Reynolds et al.

[15] 3,698,823

[45] Oct. 17, 1972

[54] ATTITUDE INDICATING INSTRUMENT

[72] Inventors: Robert W. Reynolds, Los Angeles; George P. Wight, Simi, both of Calif.

[73] Assignee: Clary Corporation, San Gabriel, Calif.

[22] Filed: July 6, 1970

[21] Appl. No.: 52,383

[52] U.S. Cl. .............................. 356/250, 33/204 A
[51] Int. Cl. ........................................ G01c 19/34
[58] Field of Search..33/204 R, 204 A, 204 C, 204 J; 356/138, 148, 149, 250; 350/286, 287

[56] References Cited

UNITED STATES PATENTS 1,918,904  7/1933  Gette, Jr. ..................... 33/204
2,594,406  4/1952  Draper ...................... 33/204.2

Primary Examiner—Ronald L. Wibert
Assistant Examiner—F. L. Evans
Attorney—Fred N. Schwend

[57] ABSTRACT

A gyroscopically controlled artificial horizon indicating device for aircraft having a light mask carried by the gimbal means of the gyroscope, the mask having a slit forming a representation of the aircraft. An image of the slit is projected onto a translucent window by an optical system including a prism effective to invert the projected image of the slit in an upright plane relative to the aircraft but does not revert such image in a lateral plane. A horizon representing line on the window provides a reference for determining the relative position of the projected image and therefore the attitude of the aircraft.

4 Claims, 8 Drawing Figures

PATENTED OCT 17 1972 3,698,823

INVENTORS:
ROBERT W. REYNOLDS,
GEORGE P. WIGHT
BY *Fred F. Schwend*
ATTORNEY.

ATTITUDE INDICATING INSTRUMENT

BACKGROUND OF THE INVENTION

This invention relates to attitude indicating instruments for dirigible craft, such as airplanes, helicopters, spacecraft, submarines or the like which are capable of moving into different attitudes relative to a horizontal plane.

DESCRIPTION OF THE PRIOR ART

Heretofore, artificial horizon indicating instruments have generally comprised a housing fixed to the craft and in which a gyroscope is mounted, the latter being coupled to a horizon indicating bar or indicator so as to maintain the horizon bar in a horizontal position regardless of the attitude of the craft. A model aircraft or silhouette is fixed relative to the housing and thus, as the craft is maneuvered into different attitudes, the silhouette remains fixed relative to the craft, and therefore to the pilot, and the horizon portrayed by the horizon bar appears to move or tilt. This is particularly unnatural since the apparent movement is in a direction opposite to that of the actual movement of the craft and therefore the natural tendency is to move or bank the craft in an opposite or wrong direction.

Although pilots eventually school themselves into proper reaction to instruments of the above type it requires mental effort and is particularly confusing to inexperienced pilots and has been known to cause pilot errors and vertigo.

Attempts have been made heretofore to overcome the above problem by providing mechanical linkages or the like which are coupled to the gimbal system of the gyroscope so as to move a model airplane or silhouette relative to a horizon indication which is fixed relative to the instrument housing, i.e., to the pilot. In this case, for example, if the craft lowers a right wing, the silhouette will do likewise relative to the horizon line and this will appear natural to the pilot so that his reaction will also be natural. The U.S. patent to Draper U.S. Pat. No. 2,515,200 discloses such a system which is intended to provide a natural portrayal of the attitude of an aircraft to the pilot. However, in this and other systems of this nature of which applicants are aware, mechanical linkages or the like coupled to the gyroscope gimbal system not only result in complicated mechanisms but also exert a drag on the gimbal system which tend to introduce detrimental precession effects. This is particularly important when vibration is encountered.

SUMMARY OF THE INVENTION

Applicants have discovered that the above noted natural portrayal of the attitude of an aircraft or the like can be obtained optically without coupling any mechanical linkages or movable parts to the gimbal system. This is accomplished by projecting the image of an aircraft representing indicator carried by the gimbal system through an optical system which inverts the image in an upright plane relative to the craft but does not revert such image in a lateral plane. This provides an improvement even over the present conventional form of artificial horizon indicating instrument in which a horizon bar is mechanically coupled to the gyroscope gimbal system.

Accordingly, a principle object of the invention is to provide simple and yet reliable attitude indicating instrument which will present a natural portrayal of the craft and the horizon to the pilot.

Another object is to provide a gyroscopically controlled attitude indicating device in which all linkages and other physical connections between the gyroscope or its gimbal system and the attitude indicating device or devices are eliminated.

Another object is to provide an attitude indicating device of the above type in which an indication of the position of the craft relative to the horizon is optically projected on a screen in a natural manner which will reduce any mental effort on the part of the pilot.

Another object is to reduce the number of operating parts in an artificial horizon indicating instrument.

Another object is to reduce the amount of light energy necessary to project a portrayal of the relative attitude of a craft and the horizon.

BRIEF DESCRIPTION OF THE DRAWINGS

The manner in which the above and other objects of the invention are accomplished will be readily understood on reference to the following specification when read in conjunction with the accompanying drawings, wherein.

DESCRIPTION OF THE PREFERRED EMBODIMENT

Figure 1:
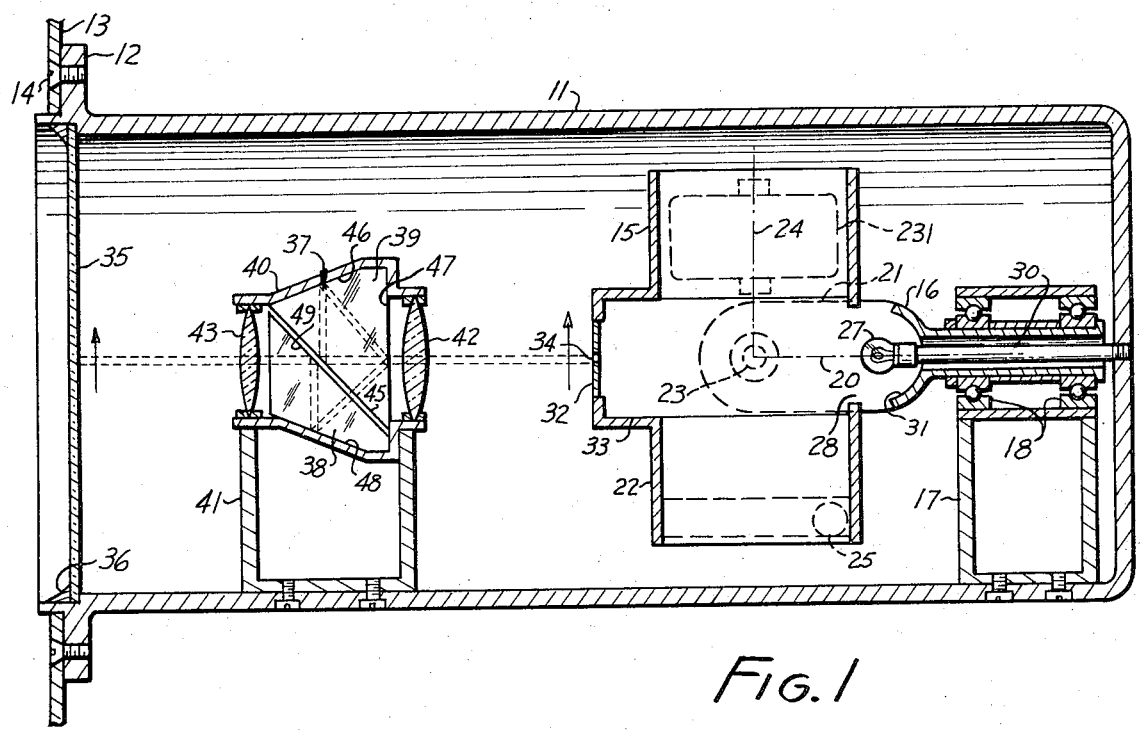
FIG. 1 is a longitudinal sectional view of an artificial horizon indicating instrument embodying a preferred form of the present invention and illustrating the same mounted in an aircraft.

Referring to FIG. 1, the instrument comprises a housing or casing 11 having a flange 12 at its forward end which is removeably secured to the instrument panel 13 of the aircraft by screws 14.

A continuously driven gyroscope generally indicated at 15, is mounted within housing 11 adjacent the rear end thereof and comprises a tubular outer gimbal member 16 rotatably supported by a bracket 17 through ball bearings 18 for free movement about an outer gimbal or roll axis 20. The gimbal member has spaced arms, one of which is shown at 21, which pivotally support a tubular inner gimbal member 22 at 23 for movement about an inner gimbal or pitch axis extending perpendicular to and intersecting the axis 20.

A gyro motor and rotating mass indicated by the dotted lines 231 is suitably mounted within the upper end of the gimbal member 22 with its spin axis 24 extending perpendicular to and intersecting the axes of the inner and outer gimbal members. An erector device indicated by the dotted lines 25 is mounted within the lower end of the gimbal member 22 for maintaining the spin axis of the rotor 23 in a vertical position.

Since gimballed gyroscopes and erection devices for controlling the same are well known in the art they will not be disclosed in detail herein. For example, the co-pending application of E.R. Brastow et al., Ser. No. 782,208, filed on Dec. 9, 1968 discloses a motor driven rotating gyro mass which would be suitable for the present purpose. Also, the U.S. Pat. No. 2,603,095 to C.E. Barkalow discloses a suitable gyro erecting device.

A small incandescent filament type lamp 27 is located adjacent an opening 28 in the wall of the gimbal member 22 and is supported by a tubular post 30 extending within the gimbal member 22 and mounted on the gear wall of the housing 11. The interior surface 31 of the outer gimbal member is preferably silvered to reflect light from the lamp 27 onto mask or reticle 32 suitably attached to a light tight protrusion 33 on the member 22 and formed with a slit 34 preferrably having an outline generally representing a rear view outline of an aircraft.

A flat translucent screen or window 35 is secured across the open front end of the housing by a retainer ring 36 and a Pechan type prism generally indicated at 37 is located intermediate the screen and the gyroscope 15. The prism 37 comprises two generally triangular prism elements 38 and 39 which are spaced a slight distance apart and are carried by a combined prism and lens carrier 40 mounted on a bracket 41 secured to the interior of the housing 11. The carrier also supports a collimating lens 42 and an objective lens 43 arranged to focus an image of the illuminated slit 34 onto the screen 35.

Figure 7:
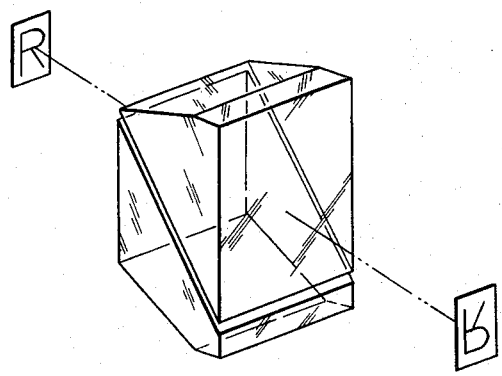
FIG. 7 is a perspective view illustrating a Pechan prism and its image inversion properties.

The Pechan type prism is well known in the art and is described in the military standardization handbook "Optical Design" MIL-HDBK-141 dated Oct. 5, 1962 and published by the Standardization Division, Defense Supply Agency, Washington, D.C.. The Pechan prism has the property of inverting an image transmitted therethrough in one plane only, as depicted in FIG. 7, and also of reducing the overall length of the optical system. Light rays entering the prism through the lens 42 are reflected from the surface 45 onto a silvered surface 46, then onto surface 47, then onto silvered surface 48 and finally onto surface 59 from which it is reflected through the objective lens 43 and onto the screen 35 along an axis parallel with the axis of entry.

Since only the relatively small area of the slit 34 forms the projected image, only a small amount of light energy is required. Further, because of the small area of the image only simple and relatively inexpensive optical elements are required to form a sharply focused image on the screen 35.

Figure 2:
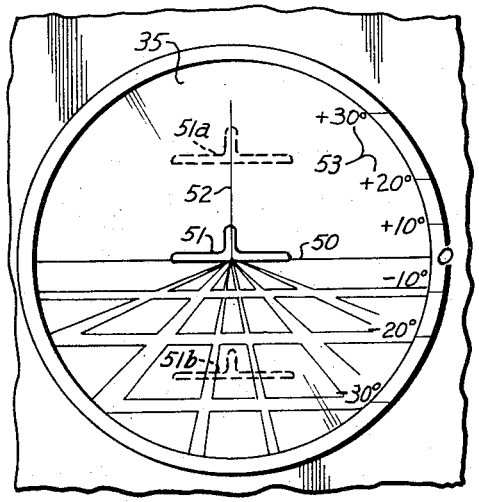
FIG. 2 is a front view of the instrument in which an image representing the aircraft is projected, portraying the craft in a normal horizonal attitude.

Since inversion of the image of the slit 34 occurs in an upright plane only with respect to the aircraft, and not in a laterally extending plane, rolling of the aircraft, and therefore the housing 11, about the roll axis 20 will cause the image of the slit projected on the screen 35 to rotate twice the amount of the actual angular roll or bank. In other words, if the aircraft were to roll 10°, the image would rotate 20° in the same direction. On the other hand, the rays entering the emerging from the prism extend along coincident axes both in a horizontal plane and in a vertical plane. Thus, considering a horizon representing member or lone 50 (FIGS. 2 and 3) to be painted on or otherwise fixed relative to the screen 35 in a location intersecting the optical axis of the system and extending parallel to the horizontal or lateral plane of the aircraft, when the aircraft is in level flight the projected image 51 of the reticle will overlie the horizon line 50 as seen in FIG. 2 and will be centered relative to an upright or vertical representing line 52 which may be painted on the screen 35. Obviously, means may be provided to adjust the horizon line vertically relative to the housing to compensate for aircraft trim, i.e., level flight in a nose high or nose low condition.

If the aircraft is placed in a climbing attitude the housing 11 will tilt counter clockwise about the pitch axis of the pivots 23 and the image, as shown, for example, at 51a, will appear above the horizon by an amount proportional to the angle of climb which is indicated by indicia 53, inscribed on the face of the screen 35. Similarly, if the aircraft is placed in a diving attitude, the image will be located below the horizon line, as indicated, for example, at 51b.

If the aircraft is placed in a roll attitude of say, 15°, the horizon line 50 will, of course, actually extend at 15° to the true horizontal plane, but due to the fact that the projected image 51 is rotated at twice the angular distance in the same direction, the indicated roll will be 15° relative to the horizon line 50. Thus, this optical method displays the aircraft as it would be seen by another pilot from behind while flying on a level course.

Figure 3:
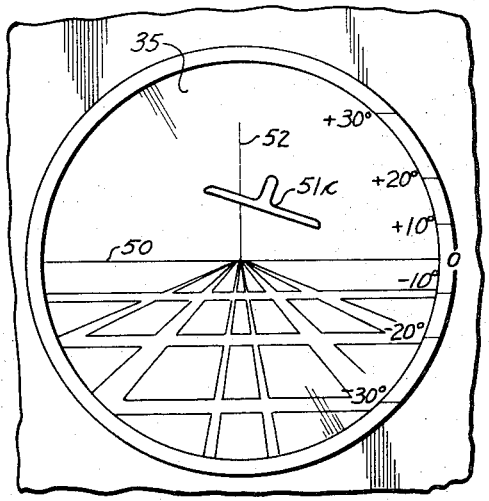
FIG. 3 is a view similar to FIG. 2 but wherein the image portrays the craft in a banking climb.
Figure 8:
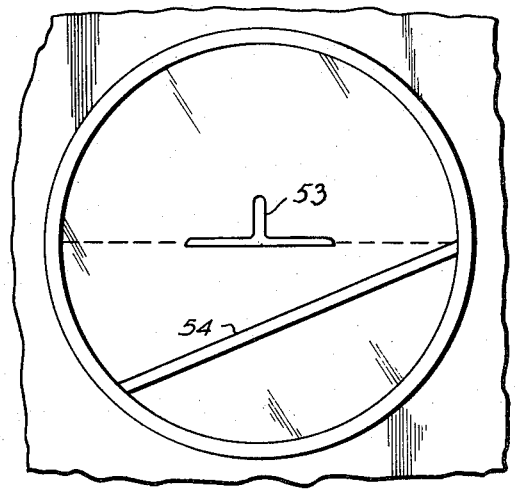
FIG. 8 is a front view similar to FIG. 3 but illustrating a conventional artificial horizon indicating instrument.

Now, if the aircraft is placed in a climbing bank of say 20° and at a 15° right roll or bank attitude, the image will be located as shown at 51c (FIG. 3). Of particular importance is the fact that since the reticle is located intermediate of the intersection of the gimbal axes and the screen 35, the image will be displaced somewhat from the vertical reference line 52, as shown. This will give a further realistic indication of the correct attitude of the aircraft, indicating that the same is turning to the right due to its climbing banking attitude. In contrast, the portrayal of the same condition by a conventional artificial horizon instrument is shown in FIG. 8 wherein an aircraft silhouette 53 is fixed relative to the aircraft and therefore to the pilot. It will be noted herein that the pilot, when viewing the instrument, tends to associate the silhouette with his aircraft and therefore the horizon, as truly represented by a gyroscopically controlled horizon bar 54, appears tilted, although the reverse is true.

FIRST MODIFIED FORM OF THE INVENTION

Figure 4:
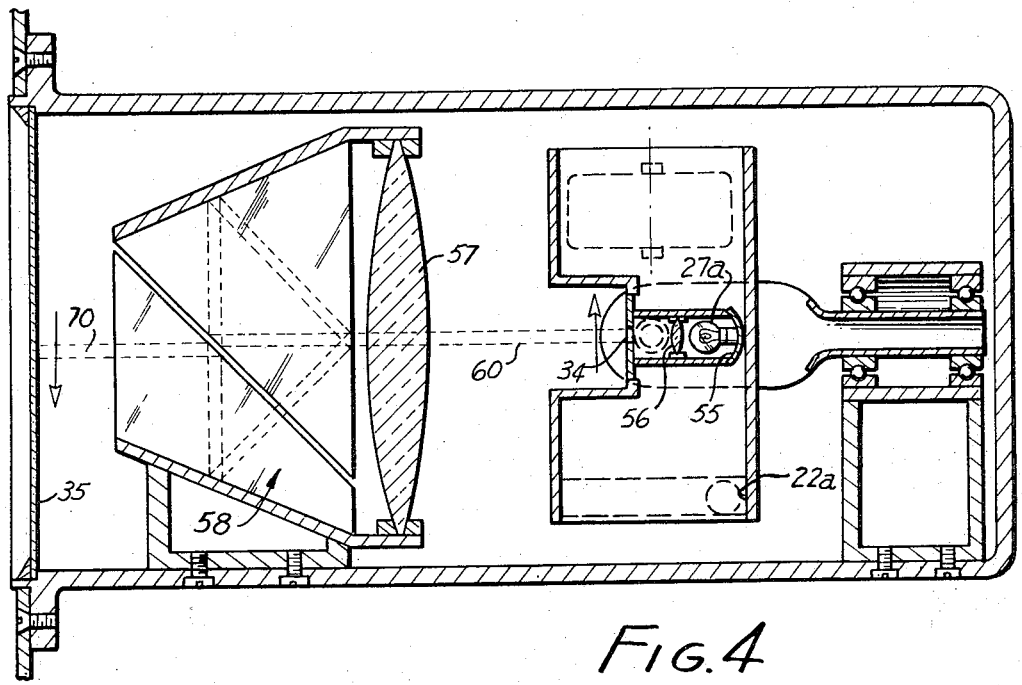
FIG. 4 is a longitudinal sectional view through a modified form of the invention.

FIG. 4 illustrates a modified form of the invention, in which the lamp 27a is supported by the inner gimbal member 22a in front of a parabolic reflector 55. A collimating lens 56 directs a collimated beam of light through a reticle slit 34, through a double convex lens 57 and Pechan type prism 58, onto the screen 35. The beam 60 will sweep the face of the prism as the attitude of the aircraft changes and the emerging beam, 70, which may be slightly displaced from the entry beam 60 depending on the spacing between the prism elements, will be projected onto the screen in the manner similar to that shown in FIG. 1.

SECOND MODIFIED FORM OF THE INVENTION

Figure 5:
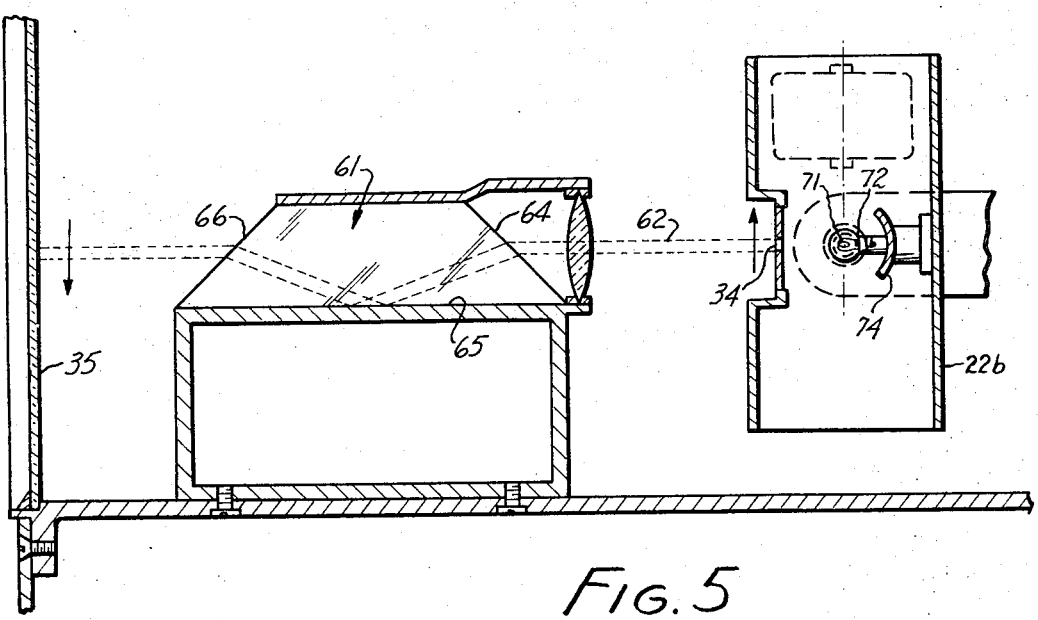
FIG. 5 is a longitudinal sectional view, with parts broken away, illustrating another modified form of the invention.

FIG. 5 illustrates a further modified form of the invention in which a Harting-Dove type prism 61 is provided in lieu of the Pechan type prism. Prism 61 has the same property as that of the Pechan type prism, i.e., of inverting an image passing therethrough in an upright plane and not in a lateral plane and of directing emerging rays along an axis coincident with the axis of entry. Here, the filament, i.e., 71 of lamp 72 is shown located on the pivot axis of the inner gimbal 22b, a spherical reflector 74 being supported behind the lamp. Rays 62 forming an image of the reticle slit 34 are refracted downwardly by the prism surface 64 and are then reflected by surface 65 toward the surface 66 from which they were again refracted along an axis parallel with the axis of entry and onto the screen 35. Such prism, which is well known in the art and described in the above noted handbook "Optical Design" also exhibits the property of rotating a beam of light passing therethrough at twice the angular rate of rotation of the beam entering the same so as to cause the projected image to assume the position mentioned in regard to FIGS. 2 and 3. The well known double Dove prism could also be employed.

THIRD MODIFIED FORM OF THE INVENTION

Figure 6:
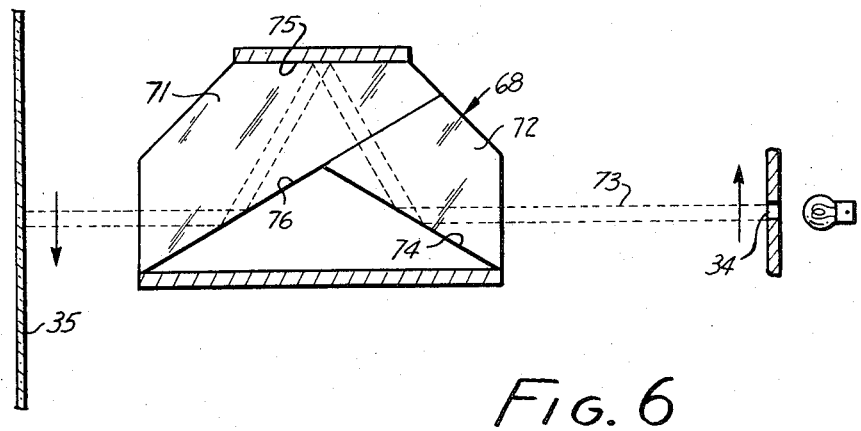
FIG. 6 is a longitudinal sectional view, with parts broken away, illustrating another modified form of the invention.

FIG. 6 illustrates still another form of the invention in which a Reversion type prism 68 is employed to invert the image of the reticle slit 34. Such Reversion prism is also well known in the art and is described in the above noted handbook "Optical Design." The prism 68 comprises two prism elements 71 and 72 cemented together and suitably supported in the housing 11. Here, the beam from the reticle slit 34 enters the prism and is reflected by surface 74 onto silvered surface 75 from which it is reflected onto surface 76 and then is projected onto the screen 35. Such prism likewise inverts the image in an upright plane only.

It will be noted that a common property of the above noted prism systems is that an odd number of reflecting surfaces are provided so that the emerging image is inverted in a vertical plane and not in a horizontal plane. It will be obvious that other forms of prisms and/or mirror systems could be used to accomplish this result.

It will also be noted that the instrument will operate properly through a 360° roll of the aircraft.

I claim:
1. An attitude indicating device for a dirigible craft comprising a housing adapted to be fixedly mounted on said craft,
   a translucent screen extending across an opening in said housing,
   gimbal means carried in said housing for movement about mutually perpendicular pitch and roll axes,
   an indicator supported by said gimbal means,
   a rotatable mass supported by said gimbal means for rotation about a vertical axis to maintain said indicator in fixed relation to a horizontal plane in different attitudes of said housing,
   an optical system carried in said housing intermediate said screen and said indicator for projecting an image of said indicator onto said screen,
   said optical system including an optical prism effective to invert the image of said indicator projected on said screen in an upright plane with respect to said housing and not in a lateral plane with respect to said housing,
   and means in front of said screen and fixed relative to said housing forming a horizon representation.
2. An attitude indicating device according to claim 1 wherein said prism comprises a Pechan prism.
3. An attitude indicating device according to claim 1 wherein said prism comprises a Harting-Dove prism.
4. An attitude indicating device according to claim 1 wherein said prism comprises a Reversion prism.

* * * * *